United States Patent [19]
Ketels

[11] Patent Number: 4,779,306
[45] Date of Patent: Oct. 25, 1988

[54] DEVICE FOR DEBONING MEAT

[75] Inventor: Gerardus H. J. Ketels, Grave, Netherlands

[73] Assignee: Stork Protecon B.V., Oss, Netherlands

[21] Appl. No.: 46,035

[22] Filed: May 1, 1987

[30] Foreign Application Priority Data

May 2, 1986 [NL] Netherlands .................. 8601139

[51] Int. Cl.⁴ .................................. A22B 17/04
[52] U.S. Cl. .................................... 17/1 G
[58] Field of Search ...................... 17/1 G, 46

[56] References Cited

U.S. PATENT DOCUMENTS 2,897,536 8/1959 Bergstrom et al. .

FOREIGN PATENT DOCUMENTS 0070605 1/1983 European Pat. Off. .
0086020 8/1983 European Pat. Off. .
0133332 2/1985 European Pat. Off. .

Primary Examiner—Willie G. Abercrombie
Attorney, Agent, or Firm—Harness, Dickey & Pierce

[57] ABSTRACT

A deboning press has a roller with a number of pressing stations around its periphery. It is rotated stepwise to bring each station in turn under a pressing element. Pieces of meat with at least one bone therein are brought in a station when it is not under the pressing element and are then, when the roller has rotated to the corresponding position, pressed by the pressing element so that the meat is pressed away sideways and the bone remains between the pressing surfaces. A sliding ejector removes the meat from the press. The pressing bodies may be hard-elastic and there may be a bone remover with movable hooks to remove the bones remaining in the stations of the roller.

22 Claims, 2 Drawing Sheets

DEVICE FOR DEBONING MEAT

SUMMARY OF THE INVENTION

The invention relates to a device for deboning meat, having two pressure elements which can move towards and away from each other, one of which can be driven in the direction of pressing, and between which the meat with bone can be pressed in such a way that the meat is pressed out from between the pressure faces and the bone remains between the pressure faces.

Such devices are known, for example from Dutch patent application Nos. 81.03360 and 82.00076 of Applicants and their corresponding U.S. application now issued as U.S. Pat. No. 4,594,751 on June 17, 1986. In these, pieces of meat with bone are placed on a conveyor belt, carried by it into the press, and pressed. The meat is pressed off the bone and pressed out from between the pressure faces, and after opening of the press, the conveyor belt moves further in order to remove the bone from the press and to bring in a new piece of meat with bone.

Such devices have various disadvantages. The construction is farily complex, the conveyor belt, which lies between the pressure faces during the pressing, is susceptible to damage, and the device takes up a large amount of space. The discharge of the meat by means of rotatable cutting slides is complex, the bone is not always reliably removed from between the pressure faces, and the device is not so easily accessible for cleaning.

SUMMARY OF THE INVENTION

The object of the invention is to make an improvement herein, and to this end a device of the type referred to in the preamble is according to the invention characterized in that disposed under said pressure element which can be driven in the direction of pressing is a roller, on which a number of press dies for pieces of meat with bone are disposed at regular intervals over the periphery, each press die itself being designed as one of the two mating pressure elements, which roller has means for stepwise rotation thereof, in such a way that each press die moves in succession past a station for bringing in pieces of meat with bone, past the pressing station with pressure element which can be driven in the direction of pressing, and past a station for discharge of the bone which has been left behind.

It appears possible thus to eliminate the disadvantages of the known devices through the fact that the conveyor element itself (the roller) acts as part of the press, while with a device taking up little space and simple to construct a high capacity can be achieved, and removal of the meat pressed away from the bones is possible in a simple and efficient manner, while the device has also become easily accessible for cleaning purposes.

Per se, all kinds of processing machines are known, in which the objects to be processed or the processing devices move stepwise past various stations, but for the deboning of meat the invention provides a special application of this known principle which is not obvious in this special technology, and which leads to surprising results compared with known devices for this purpose.

BRIEF DESCRIPTION OF THE DRAWINGS

The invention also relates to a further development of the principle mentioned, particularly as regards a very advantageous system of removal of the pressed-away meat, for holding of the pieces of meat with bone, and for the removal of the bones left behind, all this as discussed below with reference to the example of an embodiment of a device according to the invention shown in the drawings. In said drawings.

Figure 2:
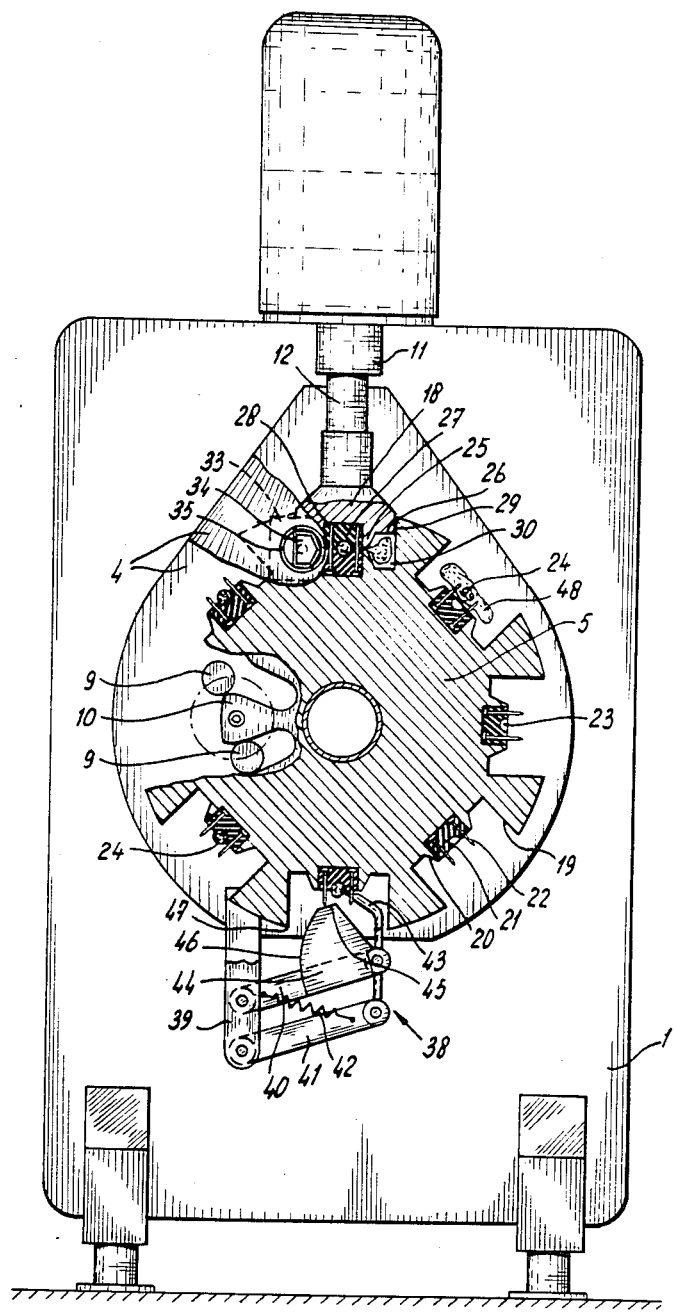
FIG. 2 is a front view, partially section along the line II—II in FIG. 1 of this device, partially broken away.

In the two figures, and particularly in FIG. 2, many parts are left out, for the sake of clarity.

DETAILED DESCRIPTION OF THE PREFERRED EMBODIMENT OF THE INVENTION

A gearbox 1, containing drive elements which are for the most part not shown, such as an electric motor with transmission or a hydraulic motor 2 and a hydraulic or pneumatic cylinder for moving a meat ejection device of a type to be described below, carries on its top side two projecting bars 3. Between them hang two bearing cheeks 4. Supported and rotatably mounted therein with trunnions 6 is a compression roller 5. The right trunnion 6 is left out of FIG. 1 to show the driving means for the roller. The roller 5 is driven by the said motor 2 by means of a shaft 7 which, seen in FIG. 1, lies behind the central axis of the roller 5 (behind said right hand trunnion, which, as stated, was left out of FIG. 1). At the left in FIG. 2, part of the section of the roller 5 is shown as broken away, so that the drive means on shaft 7 are visible in both Figures. The shaft 7 carries a disc 8 bearing two rotatable small rollers 9, engaging a disc 10 in the form of a Maltese cross, but with eight recesses. This disc 10 is fixed against the right end wall of roller 5. The disc 10 has eight radial grooves, two of which are seen in FIG. 2, into which the rollers 9 fit in sliding and rolling fashion, while on the outside of the disc the walls of the grooves are rounded off smoothly outwards in a circle to form between every two grooves a cylindrical head which is flattened off on the outside as seen in FIG. 2. The two rollers 9 are diametrically opposite each other on disc 8. If one roller is in the straight part of a groove in disc 10, then the other roller is free of the disc.

When one roller moves out of that groove, the other roller moves inwards into an adjoining groove, and in the intermediate positions said cylindrical head lies between the two rollers. This forms a construction which is known per se, so that it need not be discussed in any further detail and it will be clear from FIG. 2. When a roller 9 moves through the straight radial part of a groove, it turns the roller 5 and in said intermediate positions the rollers 9 hold the roller 5 still through the fact that said cylindrical head is in a fitting position between them.

Figure 1:
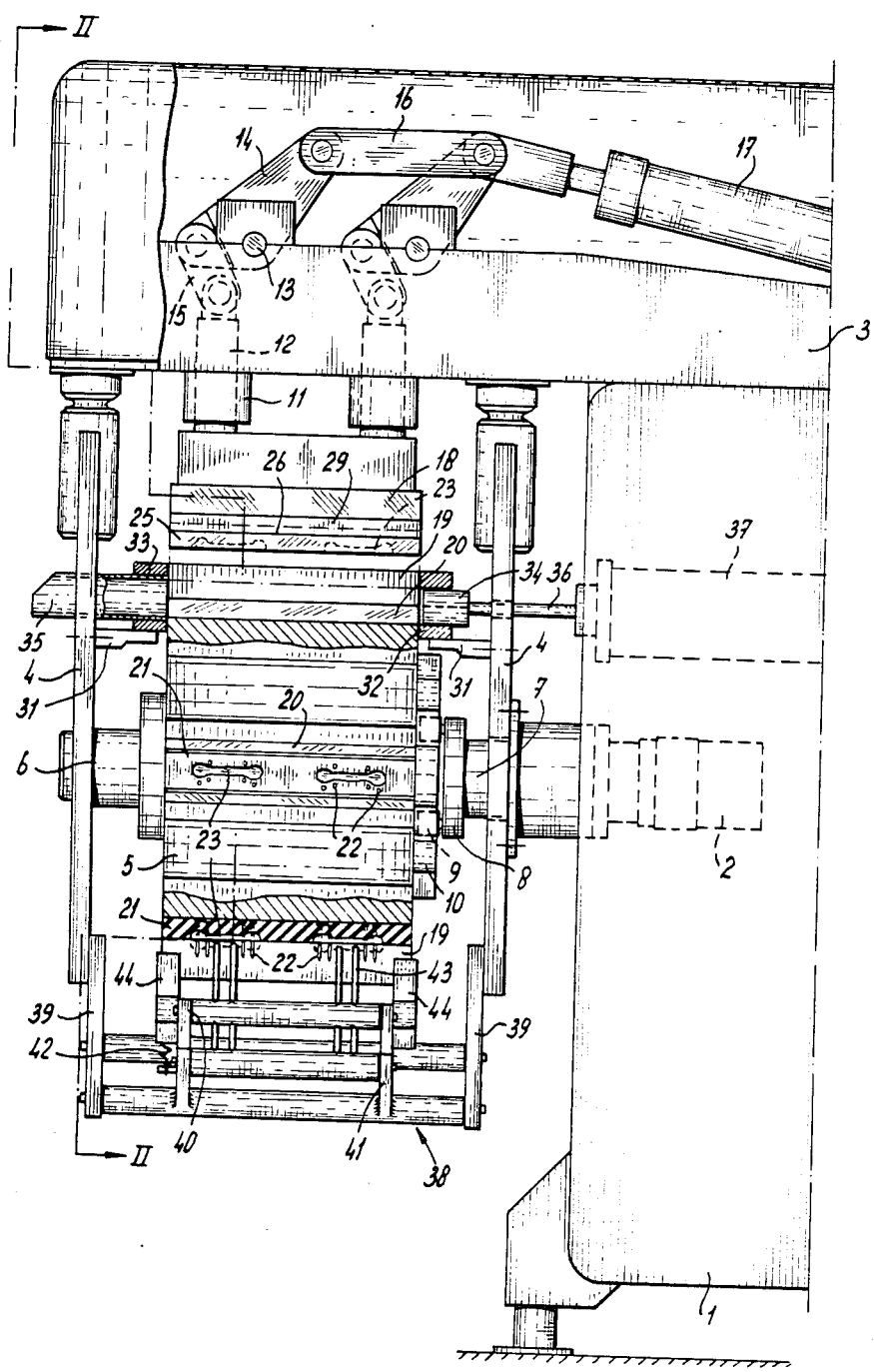
FIG. 1 is a rather schematic vertical view, partially section parallel to the horizontal axis of the roller of such a device.

In this way the roller 5 is rotated step by step, so that each station therein (to be described below) comes under the top pressure die 18 in turn, and the movement of said die up and down is synchronized therewith, so that each time the roller stops said die moves down to debone a piece of meat and upwards again to release the roller for the next rotating step through, in this case, 45 degrees. Disposed between the bars 3 is a top press device, formed by two push rods 12 which are guided to move vertically in blocks 11 between said bars, above this at the top of the bars rocking levers 14 journalled at 13, links 15 between said levers and the rods 12 and a hinge link 16 between the top ends of said levers. A hydraulic cylinder 17 fixed with is other end hingedly to the right end of the bars 3, as seen in FIG. 1, is hingedly connected with its piston rod to the top end of the right rocking lever 14. The push rods 12 carry the top die 18.

The press roller 5 has eight stations uniformly distributed over the periphery, each with a recess bounded by walls 19, which run parallel to the radial plane through the centre of the station in question and through the axis of the roller. In the bottom of each recess is a raised part 20 with sloping walls, and embedded in the centre thereof is a block 21 of hard-elastic plastic such as polyurethane. A number of steel pins 22 with sharp point extend through each block 21 and rest with a thickened head on the bottom of the recess. These pins project for some distance beyond the block. Shown in FIG. 1 are twelve pins per block, but there can also be more or fewer pins per block. Disposed in the block 21 is a recess 23 for the accommodation of a bone 24 from the meat to be processed, and this recess can be simple or more complex in shape, depending on the shape of the bone, and it can if necessary be suitable for taking up more than one bone from the same piece of meat.

The top die 18 has in the bottom face a lowered part 25, through slanting walls passing into the approximately horizontal face 26, and disposed in part 25 is a recess in which a hard-elastic block 27 is accommodated, for example in shape and material corresponding to the blocks 21 of roller 5, thus also with a bone recess 23 (FIG. 1), but without pins 22 but with recesses 28, into which said pins fit. The die 18 fits with its side walls 29 in sliding fashion between the walls 19 of each station of roller 5. If the top die 18 is pressed downwards as far as possible into a station of the roller 5, this gives rise to the situation shown in the top centre of FIG. 2, in which the die 18 closes off to the top the space between the walls 19 in the station. Spaces 30 are then left on either side of the parts 20 and 25 pressed onto each other in the process. Provided on the bearing cheeks 4 are supports 31, on which rest guide blocks 32 and 33, which—by means not shown—during the pressing are pressed hydraulically, pushing off from the bearing cheeks, onto the opposite end walls of the roller 5, and which are released during the stepwise turning of the roller. The guide blocks 32 and 33 shut off the pressing area during the pressing, in order to prevent meat from coming out at the end walls of the roller during the pressing. Block 32 has two continuous openings, through each of which a meat ejector 34 is movable. Block 33 also has two continuous openings, provided with a meat discharge pipe stub 35 which leads beyond the adjacent cheek 4. In FIG. 2 the cross section of the roller is cut away locally at top left of centre, in order to show a view of a part of block 33 with such a pipe stub 35. The two meat ejectors 34 are connected to a piston rod 36 of a hydraulic or pneumatic cylinder 37 in box 1, said rod having such a long stroke that the meat ejector can move to the left from the position shown in FIG. 1 into the meat discharge pipe stub 35.

Below the roller 5 is a bone remover 38. On arms 39, each fixed to a cheek 4, there is a parallelogram lever construction, the links 40 and 41 of which are urged by a spring 42 with their right ends to swing upwards. The parallelogram is completed by the said links 40 and 41 on the right in FIG. 2 being hingedly connected to ejector hooks 43. The top links each carry a cam 44.

This device works as follows. When the roller 5 being driven by the drive 2, 7–10 stops in the position shown in FIG. 2 a piece of meat 48 with bone 24, for example a leg, shoulder or ham, is placed in the station directly top right on the block 21 and is pressed thereon so that the pins 22 stick into the meat and the bone is directly above the bone-accommodating cavity 23. It can be seen from FIG. 1 that two pieces of meat can be laid side by side in this station in this way. The roller is now turned to the left (in FIG. 2) with the top die 18 in the raised position until the station in question with the said meat is directly underneath said top die. The cylinder 17 is now operated in order to move the top die 18 downwards. In the process it presses, with its elastic pressure block 27, the meat onto pressure block 21 of the roller, while the pins 22 pass through and out of the meat and go into the recesses 28, and the meat is gradually pressed out sideways between the pressure faces and the bone is pressed into the recesses 23. This continues until the bottom face of the lowered part 25 of the die is pressed with force onto the top face of the raised part 20 of the particular station of the roller. The two meat accommodation spaces 30, which are closed all the way round during the downward movement of the top die 18, now take up all the meat pressed off the bone and pressed away sideways from between the pressure blocks 21 and 27. The tendons and ligaments connecting the meat to the bone are largely cut through in the process as a result of the high pressure forces between the narrow mating faces of the parts 20 and 25. The meat ejectors 34 are now put into operaton; they fit in sliding fashion into the spaces 30, and completely fill the cross section thereof, so that the meat is thereby taken to and through the meat discharge stubs 35, where it can be collected, while remaining tendons and ligaments still connecting the meat to the bone are torn off.

The top die now moves upwards, and the roller can be turned one step, while a piece of meat with bone previously positioned can be pressed from the bone at the station coming underneath it, and so on. A collecting device, not shown, is provided under the roller for the bones. Said bones can fall out of the station once the station, after the pressing, is turned downwards so far that the parallel side walls 19 are approximately horizontal. In a number of cases the bones will remain enclosed in the recesses 23 of the elastic blocks 21. For the recess 23 of the top die the jamming of bones therein can be avoided by making it somewhat larger and/or so self-unloading that the bones will certainly not become stuck therein. If bones remain confined in the recesses 23 of the roller, they are forced out of them by the bone remover 38 while the station in question is at the lowest position. The cams 44 thereof are held by the spring 42 in cam contact with the end parts of the roller until the roller with a stud part between two stations releases the cams. When said cams come into contact with the cylindrical outside wall of said stud parts a face 45 of each cam slides in fitting fashion thereover, and the top ends of the hooks 43 do not then protrude upwards past said faces 45. When such a stud part is passed so far that it releases the cams, the spring 42 pulls the bone remover upwards until it is in the position shown in FIG. 2, while first the slanting top parts of the hooks slide along an edge of the adjoining stud part. On further turning of the roller, the pointed top ends of the hooks hook behind the bone 24 in such a way that it is loosened and falls out of the device. Immediately afterwards, the curved faces 46 of the cams contact the edge 47 of the next stud part of the roller, so that on further turning of the roller the bone remover 38 is moved downwards, and so on.

The cheeks 4 give the great advantage that during pressing the pressure force is absorbed and passed on directly between the top die 18 and the roller, without putting strain on other parts of the device 9.

I claim:

1. Device for deboning meat comprising two pressure elements having pressure faces supported for relative movement towards and away from each other, means for driving one of said pressure elements in the direction of pressing, said pressure faces being constructed and arranged for pressing meat with bone for pressing the meat out from between said pressure faces and retaining the bone between said pressure faces, characterized in that a roller is journaled adjacent said one pressure element, said roller carrying a number of press dies for pieces of meat disposed at regular circumferential intervals over the periphery of said roller, each of said press dies comprising the respective other one of the two mating pressure elements, means for rotating said roller in a stepwise rotation for bringing each press die in succession past a first station for insertion in said press die pieces of meat with bone, past a second pressing station in registry with said one pressure element, and past a third station for discharge of the bone which has been left behind.

2. Device according to claim 1, wherein the roller is journaled by a bearing cheek at each end of and next to said roller, and the one pressure element and its movement mechanism is carried by a construction to which said bearing cheeks are connected with direct force transmission for taking up the reaction force during pressing.

3. Device according to claim 1, wherein the roller is provided with first recesses which extend parallel to the axis on said roller along its full length, and said recesses being each laterally bounded by flat parallel walls, and a second recess is disposed in the bottom of said first recesses for receiving the pressure die.

4. Device according to claim 3, wherein the second recess is disposed in a bottom part of the first recesses symmetrically raised relative to a plane through the longitudinal axis of the roller.

5. Device according to claim 4, wherein the one pressure element has longitudinal side walls interfitting with the side walls of the first recesses of the roller, and a third recess is disposed symmetrically in said one pressure element for recieving a press die.

6. Device according to claim 5, wherein longitudinal walls defining in part the third recess in the one pressure element form raised bottom parts relative to said longitudinal walls of said one pressure element, for forming during pressing two accommodation spaces for pressed-out meat on opposite side of the press dies.

7. Device according to claim 6, wherein narrow raised bottom parts of the second recess and of the third recess at the end of the pressure stroke are pressed onto each other for separation of the pressed-out meat from the bones.

8. Device according to claim 7, further including an ejector for the meat pressed off and cut from the bones, located at said second pressure station, said ejector comprising two slide dies, whose cross section corresponds to that of the two accommodation spaces, and slidable over the length of the accommodation space.

9. Device according to claim 2, further including a closing plate at the pressure station located between each of the end walls of the pressure space and the bearing cheeks, said closing plate being hydraulically pressed against the end walls during the pressing.

10. Device according to claim 1, wherein means are provided for removing the bone from the roller in the third station.

11. Device according to claim 10, wherein said bone-removal means is located in a station diametrically opposed to the second station.

12. Device according to claim 10, characterized in that said bone-removal means is pressed under spring load towards the pressure face of the roller, and said bone-removal means being connected to cam means cooperable with the roller for operating said bone-removal means for removing a bone from said recess in response to movement of said roller behind said bone.

13. Device according to claim 1, wherein each press die in the roller has at least one projecting pin for holding the meat in and past the first station, and the one press die has openings for accommodation of said pins during pressing.

14. Device according to claim 1, characterized in that the pressure faces in the press dies are made of elastic material and that at least one of them has a recess for taking up the bone.

15. Device according to claim 13, wherein the pins rest against a hard metal end face of the second recess.

16. Device according to claim 1, characterized in that each press die has means for taking up more than one piece of meat with bone side by side and for simultaneous pressing thereof.

17. Device according to claim 2, wherein the roller is provided with first recesses which extend parallel to the axis or said roller along its full length, and said recesses being each laterally bounded by flat parallel walls, and a second recess is disposed in the bottom of said first recesses for receiving the pressure die.

18. Device according to claim 17, wherein the second recess is disposed in a bottom part of the first recesses symmetrically raised relative to a plane through the longitudinal axis of the roller.

19. Device according to claim 18, wherein the one pressure element has longitudinal side walls interfitting with the side walls of the first recesses of the roller, and a third recess is disposed symmetrically in said one pressure element for receiving a press die.

20. Device according to claim 19, wherein longitudinal walls defining in part the third recess in the one pressure element from raised bottom parts relative to said longitudinal walls of said one pressure element, for forming during pressing two accommodation spaces for pressed-out meat on opposite side of the press dies.

21. Device according to claim 20, wherein narrow raised bottom parts of the second recess and of the third recess at the end of the pressure stroke are pressed onto each other for separation of the pressed-out meat from the bones.

22. Device according to claim 21, further including an ejector for the meat pressed off and cut from the bones, located at said second pressure station, said ejector comprising two slide dies, whose cross section corresponds to that of the two accommodation spaces, and slidable over the length of the accommodation space.

* * * * *